United States Patent
Takahashi et al.

(10) Patent No.: US 6,513,987 B2
(45) Date of Patent: Feb. 4, 2003

(54) CAGED ROLLER ASSEMBLY AND REDUCTION GEAR UNIT USING THE SAME

(75) Inventors: Yasuaki Takahashi, Iwata (JP); Katsufumi Abe, Iwata (JP)

(73) Assignee: NTN Corporation, Osaka (JP)

( * ) Notice: Subject to any disclaimer, the term of this patent is extended or adjusted under 35 U.S.C. 154(b) by 1 day.

(21) Appl. No.: 09/845,328

(22) Filed: May 1, 2001

(65) Prior Publication Data

US 2001/0051011 A1 Dec. 13, 2001

(30) Foreign Application Priority Data

May 18, 2000 (JP) ........................................ 2000-145909

(51) Int. Cl.⁷ .............................................. F16C 33/46
(52) U.S. Cl. ........................................................ 384/574
(58) Field of Search ................................ 384/574, 576, 384/572, 580

(56) References Cited

U.S. PATENT DOCUMENTS

| | | | | |
|---|---|---|---|---|
| 1,651,798 A | * | 12/1927 | Ayers | 384/574 |
| 1,870,892 A | * | 8/1932 | Brown | 384/574 |
| 1,871,149 A | * | 8/1932 | Brown | 384/574 |
| 1,922,805 A | * | 8/1933 | Heim | 384/574 |
| 3,552,814 A | * | 1/1971 | Altson et al. | 384/574 |
| 3,586,407 A | * | 6/1971 | Schweitzer | 384/574 |
| 3,644,006 A | * | 2/1972 | Feuillat et al. | 384/560 |
| 4,003,609 A | * | 1/1977 | Juhas | 384/574 |
| 5,540,506 A | * | 7/1996 | Yokota et al. | 384/580 |
| 5,807,920 A | * | 9/1998 | Ueno et al. | 384/527 |

* cited by examiner

Primary Examiner—Thomas R. Hannon
(74) Attorney, Agent, or Firm—Sughrue Mion, PLLC (57) ABSTRACT

To provide a caged roller assembly having a large load bearing capacity within a limited space, substantially free from a problem associated with separation of rollers from a roller retainer in either direction radially outwardly or inwardly of the roller retainer, and excellent in assemblability while a skewing of the roller is prevented, the caged roller assembly includes a roller retainer (1) and a plurality of rollers (2). The roller retainer (1) includes a circumferential ring body (1a) of a diameter greater than the pitch circle PCD depicted by longitudinal axes of the rollers (2), and a pair of annular collars or flanks (1b) lying perpendicular to the circumferential ring body (1a). A bearing boss (4) for each roller (2) is formed in each of the annular flank (1b) on one hand, and a bearing recess (2a) is defined in each of opposite end faces of each roller (2) for operatively receiving the respective bearing bosses (4) to thereby rotatably support the associated roller (2) in a non-detachable fashion.

14 Claims, 7 Drawing Sheets

CAGED ROLLER ASSEMBLY AND REDUCTION GEAR UNIT USING THE SAME

BACKGROUND OF THE INVENTION

1. Field of the Invention

The present invention relates to a caged roller assembly having a high load bearing capacity within a limited space and a planetary reduction gear unit using such caged roller assembly.

2. Description of the Prior Art

It is known that caged roller assemblies or caged roller assemblies are used in planetary reduction gear unit employed in various applications including, for example, construction machines. This type of caged roller assemblies has long been and is currently desired to have an increased load bearing capacity. While a full type roller assembly without a roller retainer is currently available as a bearing capable of exhibiting a maximum load bearing capacity within a limited space, it has been recognized that the full type roller assembly has a handling problem, specifically difficulty in assemblage and overhauling, and often involves a potential functional problem in that some of the rollers tend to skew during the use of the bearing. To alleviate these problems recognized in the art, various caged roller assemblies have been suggested.

For example, there exists a well known caged roller bearing which comprises a plurality of rollers and a circumferentially extending annular roller retainer having pockets spaced an equal distance from each other in a direction circumferentially of the roller retainer to accommodate the rollers, and the roller retainer has the pillars that extend from a radially inner side to a radially outer side of the roller retainer. Each pillar is formed in, for example, V-shape and provided with radially outer and inner roller stoppers to retain the roller in position. With this structure, since the pillar extending radially is disposed between the neighboring rollers, it is difficult to decrease a circumferential space between such rollers to thereby increase the number of rollers employed therein.

Figure 8A:
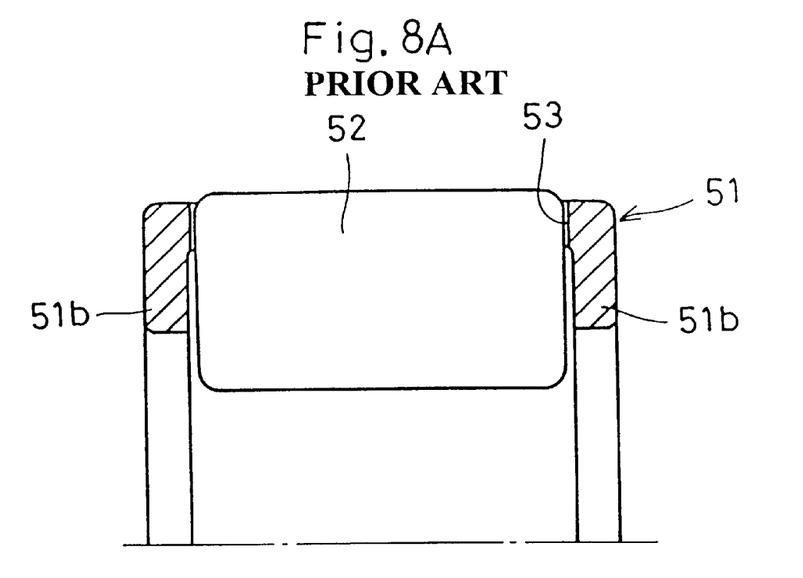
FIG. 8A is a fragmentary longitudinal sectional view, with a portion removed, showing the prior art caged roller assembly.
Figure 8B:
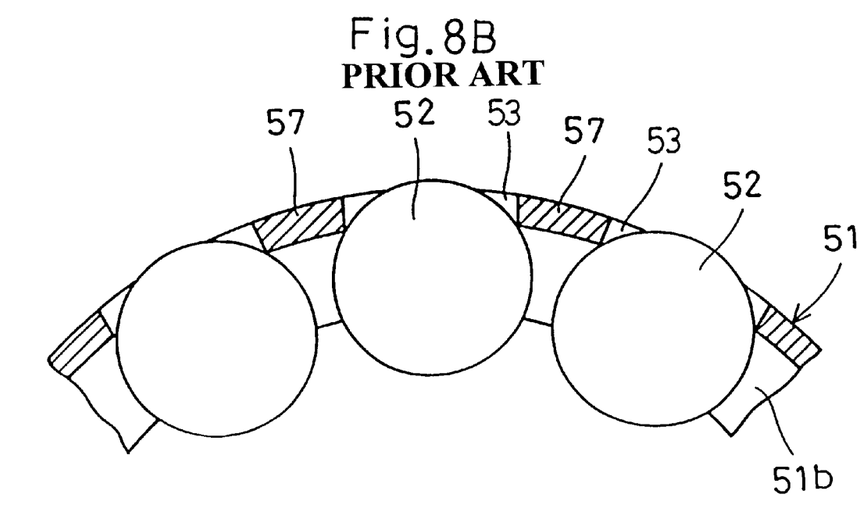
FIG. 8B is a fragmentary end view, with a portion shown in section, of a portion of the caged roller assembly shown in FIG. 8A

FIGS. 8A and 8B illustrate another prior art caged roller assembly designed to increase the number of rollers employed therein. The caged roller assembly shown therein comprises a circumferentially extending annular roller retainer 51 having opposite ends formed with annular collars 51b, and a plurality of rollers 52 rotatably accommodated within respective pockets 53 defined in the roller retainer 51 so as to be spaced an equal distance from each other in a direction circumferentially of the roller retainer 51 and as to leave a pillar 57 between the neighboring pockets 53. Where the number of the rollers 52 is increased, each of the pillars 57 has no way other than to be reduced in width, resulting in such a shape as shown in FIG. 8B.

Prior to the caged roller assembly of FIGS. 8A and 8B being mounted in, for example, a machine or a reduction gear unit, the prior art caged roller assembly is in such a condition that the rollers 52 is highly susceptible to separation or fall from the associated pockets in a direction radially inwardly of the roller retainer 51 although separation or fall of the rollers 52 in a direction radially outwardly of the roller retainer 51 is effectively refrained. Considering the ease to mount the caged roller assembly in a machine or reduction gear unit, means is necessitated to prevent the rollers 52 from inadvertently separating or falling out of the associated pockets 53 radially inwardly as well as radially outwardly by the time the caged roller assembly is ready to be mounted in the machine or reduction gear unit.

SUMMARY OF THE INVENTION

In view of the foregoing, the present invention has been devised to provide an improved caged roller assembly capable of exhibiting a high load bearing capacity even within a limited space substantially without some or all of the rollers being skewed during use thereof, and in which roller assembly prior to the caged roller assembly being mounted in a machine or reduction gear unit, separation or fall of some or all of the rollers out from the pockets in both directions radially inwardly and outwardly of the roller retainer is effectively prevented to facilitate a quick mounting or installation of the caged roller assembly in the machine or reduction gear unit.

A further important object of the present invention is to provide the improved caged roller assembly of the type referred to above, wherein means is provided to minimize depletion of a lubricant oil from a rolling surface to thereby prevent the roller retainer from being worn in frictional contact with the rollers.

The present invention has additional objects and features which would become apparent from the detailed description of preferred embodiments thereof that is herein set fort.

In order to accomplish these and other objects of the present invention, the present invention in accordance with one aspect thereof provides a caged roller assembly which includes a roller retainer including a large-diameter circumferential ring body having ends opposite to each other and a pair of annular flanks extending radially inwardly from the respective ends of the circumferential ring body, and a plurality of rollers rotatably carried by the roller retainer. The circumferential ring body has a plurality of circumferentially spaced pockets defined therein and the rollers are rotatably positioned within the respective pockets. Each of said rollers has opposite end faces each formed with an axially inwardly extending bearing recess defined therein. Bearing bosses are formed in each of the annular flanks in a circular row one for each of the pockets, the circular row of the bearing bosses in each annular flank being aligned with a pitch circle that is defined by respective axes of rotation of the rollers. The bearing bosses in the annular flanks are rotatably engaged in the bearing recesses on the opposite end faces of the associated rollers, said circumferential ring body having a diameter greater than the pitch circle of the rollers.

According to the structure described above, prior to the caged roller assembly of the present invention being mounted in a machine or reduction gear unit, not only is any possible separation of the rollers in a direction radially outwardly from the roller retainer prevented by opposite side edges of the pockets, but also any possible separation of the rollers in a direction radially inwardly from the roller retainer is prevented by the bearing bosses rotatably engaged in the bearing recesses at the opposite end faces of the rollers. Since each of the pillars of the roller retainer situated between the neighboring pockets is provided only on a radially outer side of the roller retainer, as compared with the roller retainer having the pillars that extend from a radially inner side to a radially outer side of the roller retainer such as in the prior art caged roller assembly, the roller retainer used in the present invention can have a simplified shape and be easy to manufacture, allowing to expand the limit to which each pillar situated between the neighboring pockets can be reduced in width. Accordingly, the number of the rollers that can be employed within a predetermined space available in the caged roller assembly can advantageously be increased to thereby increase the load bearing capacity of the resultant caged roller assembly. The bearing recesses defined in the opposite end faces of each of the rollers, in which the corresponding bearing bosses rigid or fast with the annular flanks engage also serve as oil sumps and, therefore, the frictional wear of respective portions of the annular flanks that are held in sliding contact with the end faces of the rollers can advantageously be minimized.

The manner in which the rollers are guided by the roller retainer can be classified into two types depending on the dimensional relationship. Where a gap between each roller and the adjacent side face of each pillar between the neighboring pockets is small relative to the size of a radial gap (play) between the bearing recess in each end face of the rollers and the associated bearing boss of the roller retainer that is engaged in such bearing recess, each roller can be guided by the pillars on respective sides of such roller. On the other hand, where the gap between each roller and the adjacent side face of each pillar between the neighboring pockets is conversely large, each roller can be guided by a portion where the bearing recess in each end face of the rollers and the associated bearing boss of the roller retainer are engaged with each other. In either cases, the rollers are guided by the roller retainer and, therefore, as compared with the full type roller assembly, any possible occurrence of skewing of some or all of the rollers can be advantageously minimized or substantially eliminated.

According to the present invention, depletion of an oil film on a rolling surface can be minimized in the following manner. In the well known prior art caged roller assembly discussed above, since the rollers are retained in position by the radially outer and inner roller stoppers formed on respective pillars of the roller retainer, it has often been observed that the oil film on the rolling surfaces of the rollers tends to be depleted in sliding contact with the roller stoppers. In contrast thereto, the present invention makes no use of such roller stoppers and, instead thereof, utilizes the side faces of the pillars to support the rollers and/or the bearing recesses in the opposite end faces of the rollers to retain the roller and, therefore, any possible depletion of the oil film on the rolling surfaces can be minimized.

The present invention in accordance with another aspect thereof provides the caged roller assembly wherein the circumferential ring body and the annular flanks both used in the caged roller assembly according to the foregoing aspect of the present invention are reversed in position relative to each other. More specifically, the caged roller assembly according to this aspect of the present invention includes a roller retainer including a large-diameter circumferential ring body having ends opposite to each other and a pair of annular flanks extending radially outwardly from the respective ends of the circumferential ring body, and a plurality of rollers rotatably carried by the roller retainer. The circumferential ring body has a plurality of circumferentially spaced pockets defined therein and the rollers are rotatably positioned within the respective pockets. Each of said rollers has opposite end faces each formed with an axially inwardly extending bearing recess defined therein. Bearing bosses are formed in each of the annular flanks in a circular row one for each of the pockets, the circular row of the bearing bosses in each annular flank being aligned with a pitch circle that is defined by respective axes of rotation of the rollers. The bearing bosses in the annular flanks are rotatably engaged in the bearing recesses on the opposite end faces of the associated rollers, said circumferential ring body having a diameter smaller than the pitch circle of the rollers.

Even in this alternative design, prior to the caged roller assembly of the present invention being mounted in a machine or reduction gear unit, not only is any possible separation of the rollers in a direction radially inwardly from the roller retainer prevented by opposite side edges of the pockets, but also any possible separation of the rollers in a direction radially outwardly from the roller retainer is prevented by the bearing bosses rotatably engaged in the bearing recesses at the opposite end faces of the rollers. Since each of the pillars of the roller retainer situated between the neighboring pockets is provided only on a radially inner side of the roller retainer, as compared with the roller retainer having the pillars that extend from a radially inner side to a radially outer side of the roller retainer such as in the prior art caged roller assembly, the roller retainer used in the present invention can have a simplified shape and be easy to manufacture, allowing to expand the limit to which each pillar situated between the neighboring pockets can be reduced in width. Accordingly, the number of the rollers that can be employed within a predetermined space available in the caged roller assembly can advantageously be increased to thereby increase the load bearing capacity of the resultant caged roller assembly.

Also, as is the case with the caged roller assembly according to the first mentioned aspect of the present invention, not only can any possible skewing of the rollers be minimized or substantially eliminated, but also the bearing recesses serve as oil sumps. Therefore, the frictional wear of respective portions of the annular flanks that are held in sliding contact with the end faces of the rollers can advantageously be minimized, and any possible depletion of the oil film on the rolling surfaces can also be prevented.

In the practice of the present invention, while each of the pockets is defined by opposite end walls and opposite side walls, leaving a pillar that is situated between the neighboring pockets while extending between the annular flanks, each of the opposite side walls of the respective pocket may be inwardly depressed at a generally intermediate portion thereof to define roller guides on respective sides of the inwardly depressed region.

According to this preferred design, while the roller guides on respective sides of the inwardly depressed region in each of the pillars provides a function of guiding the associated roller, the inwardly depressed regions ensures a smooth flow of a lubricant oil. If each roller is guided by the opposite side walls of the adjacent pocket over the entire length thereof, a smooth flow of the lubricant oil will be hampered, but the presence of the inwardly depressed regions is effective to eliminate any obstacle to the smooth flow of the lubricant oil. Accordingly, any possible loss of torque during rotation can advantageously be eliminated.

In a preferred embodiment of the present invention, while each of the pockets is defined by opposite end walls and opposite side walls, leaving a pillar that is situated between the neighboring pockets while extending between the annular flanks, and the opposite side walls of the respective pocket serve as roller guides, the pillar may have a transverse sectional shape wherein a peripheral lip region of an outer peripheral surface of the pillars is positioned radially inwardly of the outer peripheral surface of the circumferential ring body and adjacent the pitch circle.

When the peripheral lip region of the outer peripheral surface of the pillar is positioned radially inwardly of the outer peripheral surface of the circumferential ring body and adjacent the pitch circle, scraping of the lubricant oil by an edge of the peripheral lip region around each pocket can be lessened to thereby suppress a loss of torque which would otherwise occur during rotation as a result of lack of the lubricant oil.

In another preferred embodiment of the present invention, each of the bearing bosses may protrude outwardly from the respective annular flank a distance smaller than a depth of the respective bearing recess on the end face of each roller.

When the height of each bearing bosses is so defined, the tip or free end of each bearing bosses does not contact the bottom of the associated bearing recess and, instead, the end faces of the roller may slidingly contact surface portions of the annular flanks around the bearing bosses. For this reason, no local contact of the tips of the bearing bosses will occur, lessening frictional wear.

Preferably, the roller retainer is made of a synthetic resin. The use of a synthetic resin as a material for the roller retainer allows the roller retainer having the bearing bosses to be easily and efficiently manufactured.

Also preferably, the caged roller assembly may be used in a planetary reduction gear unit including a planetary gear and a crankshaft, in which case the caged roller assembly is disposed between the planetary gear and the crankshaft.

The present invention also provides a planetary reduction gear unit which utilizes the caged roller assembly of the structure discussed hereinabove. More specifically, the planetary reduction gear unit to which the present invention is applied includes an internally or externally geared sun gear, a carrier provided coaxially of the sun gear, at least one crankshaft rotatably supported by the carrier and having a plurality of eccentric cam portions, and a planetary gear mounted on each of the eccentric cam portions of the crankshaft through the associated caged roller assembly and drivingly meshed with the sun gear. The caged roller assembly of the present invention operatively intervenes between the planetary gear and the respective eccentric cam portion of the crankshaft.

The planetary reduction gear unit in which the planetary gears are mounted on the crankshaft must be of a design in which the caged roller assembly intervening between each of the planetary gears and the crankshaft should not interfere an inner diameter of the adjacent planetary gear. According to the present invention, this interference is avoided owing to the annular collars or flanks of the roller retainer. Also, in the planetary reduction gear unit of this kind, support of the planetary gears requires a relatively large load and a support sections tends to be a limited space. However, the use of the caged roller assembly in which the bearing bosses formed with the annular collars or flanks are engaged in the corresponding bearing recesses formed in the opposite end faces of the rollers permits the number of the rollers used to be increased within the margin of the limited space and, therefore, a relative large load bearing capacity can be obtained. Consequently, the planetary gear unit can be made compact in size, and installation of the caged roller assembly in the unit is facilitated.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1A:
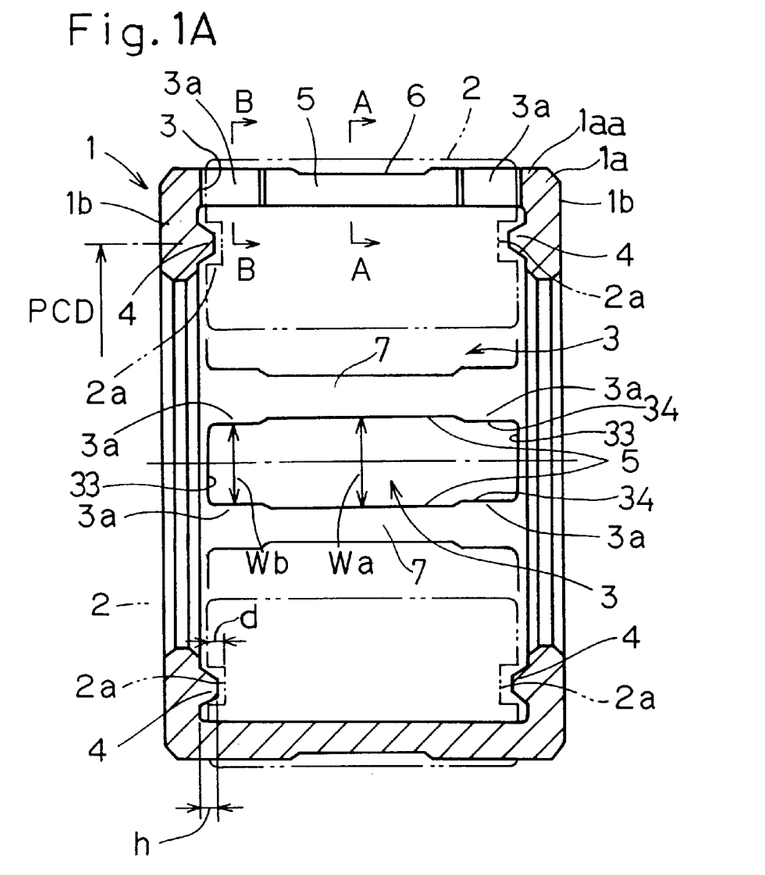
FIG. 1A is a schematic longitudinal sectional view, with a portion removed, showing a caged roller assembly according to a first preferred embodiment of the present invention.

Referring first to FIGS. 1A to 3B pertaining to a first preferred embodiment of the present invention, a caged roller assembly shown therein includes a cylindrical roller retainer or cage 1 shown in FIG. 1A and a plurality of needle rollers 2 retained rollingly by the roller retainer 1 with their axes of rotation depicting the pitch circle PCD. The roller retainer 1 is made up of a radially circumferential ring body 1a positioned radially outwardly of the pitch circle PCD and having ends axially opposite to each other, and an annular collar or flank 1b formed preferably integrally with the radially circumferential ring body 1a so as to extend a predetermined distance radially inwardly from each of the opposite ends of the radially circumferential ring body 1a.

Figure 1B:
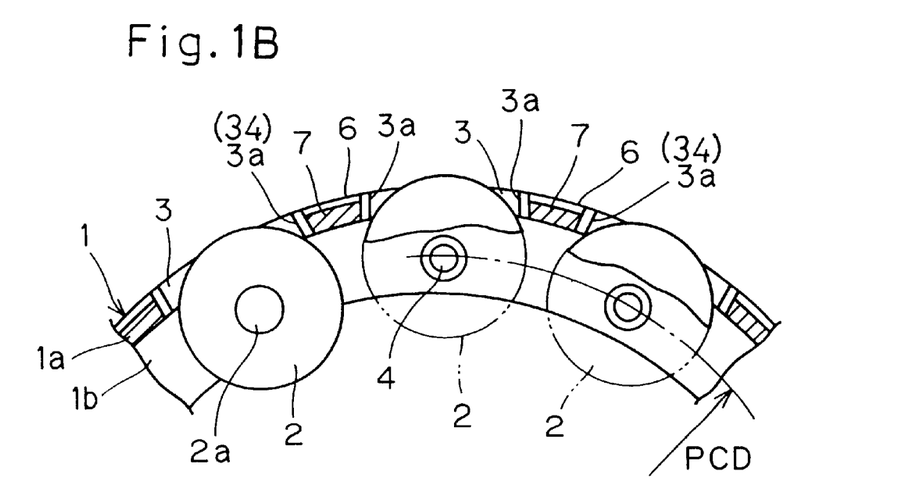
FIG. 1B is a fragmentary end view, on an enlarged scale, of a portion of the caged roller assembly shown in FIG. 1A.

A plurality of generally rectangular pockets 3 are defined in the circumferential ring body 1a and are spaced an equal distance from each other in a direction circumferentially of the circumferential ring body 1a, with a longitudinal axis of each pocket 3 oriented in a direction parallel to the longitudinal axis of the roller retainer 1. On the other hand, the annular flanks 1b extending radially inwardly from the respective ends of the circumferential ring body 1a has respective circular rows of bearing bosses 4 so positioned as to align with each other in a direction axially of the roller retainer 1, each of said circular row of the bearing bosses 4 being aligned with the pitch circle PCD. Each of the bearing bosses 4 in each of the annular flank 1b is so geometrically positioned as to occupy a location intermediate the circumferential width of the associated pocket 3.

Each of the needle rollers 2 has its opposite end faces formed with a respective bearing recess 2a depressed inwardly therefrom in alignment with the longitudinal axis thereof. The needle rollers 2 are non-detachably, but rollingly accommodated within the respective pockets 3 with the bearing bosses 4 of the circular rows engaged in the bearing recesses 2a in the opposite end faces of the needle rollers 2.

Specifically, each of the bearing bosses 4 is preferably of a generally truncated conical or semi-spherical shape having a round base and protrudes from an annular inner surface of each of the annular flank 1b a distance h smaller than the depth d of the associated bearing recess 2a. Each bearing recess 2a defined in the end faces of each needle roller 2 may be of a cylindrical or truncated conical shape and has a diameter so chosen as to allow a slight gap to be formed between a bottom surface of the bearing recess 2a and the corresponding bearing boss 4 even when the latter protrudes relatively deep into the associated bearing recess 2a as a result of an axial displacement of the needle roller 2.

While the neighboring pockets 3 defined in the circumferential ring body 1a of the roller retainer I are separated by a respective pillar 7, each of the pockets 3 is delimited by opposite inner end walls 33 and 33 and opposite side walls 34 and 34, with one of the opposite side walls 34 confronting one pocket 3 and one of the opposite side walls 34 on the pillar 7 confronting the next adjacent pocket 3. As clearly shown in FIG. 2, the opposite side walls 34 confronting each pocket 3 have a portion intermediate of the length of the respective pocket 3 that is depressed as at 5 inwardly or circumferentially of the associated pillar 7, thereby leaving roller guides 3a on respective sides of the depressed region 5 along the longitudinal axis of the pocket 3. While this depressed region 5 represents a generally trapezoidal shape with its base lying in a plane occupied by respective surfaces of the roller guides 3a and has a length La extending axially between the roller guides 3a, the depressed region 5 has its width extending completely across the thickness of the associated pillar 7 and, hence, opens radially outwardly and inwardly of the circumferential ring body 1a. Because of the presence of the depressed regions 5 in the opposite side walls 34 confronting each pocket 3, an axially intermediate portion of the pocket 3 has a circumferential width Wa, shown in FIG. 1A, that is greater than the circumferential width Wb of an end portion thereof adjacent the respective annular flank 1b.

Figure 2:
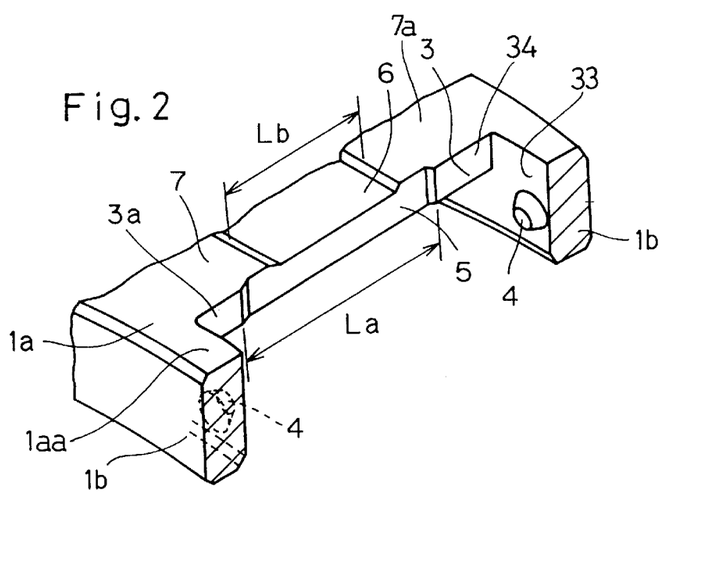
FIG. 2 is a perspective view, on an enlarged scale, showing a portion of a roller retainer of the caged roller assembly shown in FIG. 1A.

As shown in FIG. 2, the circumferential ring body 1a has an outer peripheral surface 1aa formed with a circumferentially extending grooves which is, in view of the presence of the pockets 3, fractioned into groove segments 6 each on the pillar 7. The groove segment 6 on each pillar 7 has a groove width Lb smaller than the length La of the depressed region 5.

Figure 3A:
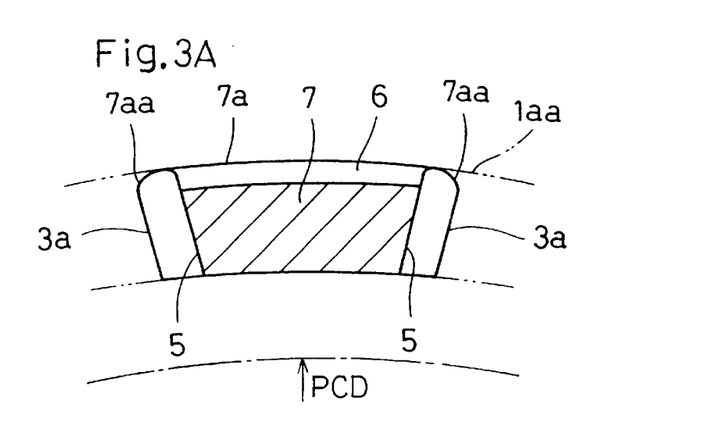
FIG. 3A is a fragmentary cross-sectional view on an enlarged scale taken along the line A—A in FIG. 1A.
Figure 3B:
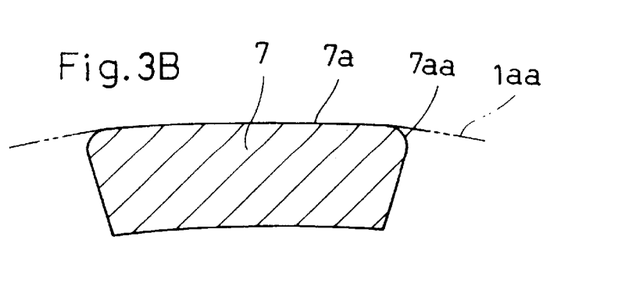
FIG. 3B is a fragmentary cross-sectional view on an enlarged scale taken along the line B—B in FIG. 1A.

FIG. 3A illustrates a transverse sectional view of each of the pillar 7 taken along the line A—A in FIG. 1A passing through an intermediate portion of the respective pillar 7 where the associated groove segment 6 is formed, whereas FIG. 3B illustrates a similarly transverse sectional view of the pillar 7 taken along the line B—B in FIG. 1A passing through one end portion of the respective pillar 7. As shown in these figures, each pillar 7 is of such a transverse sectional representation that a peripheral lip region 7aa surrounding the associated pocket 3 and lying on a radially outer surface 7a is positioned at a location radially inwardly of the outer peripheral surface 1aa of the circumferential ring body 1a in a direction adjacent the pitch circle PCD. This peripheral lip region 7aa is so chamfered as to droop downwardly from a point flush with the outer peripheral surface 1aa of the circumferential ring body 1a and, at a location generally intermediate of the width of the pillar 7, the radially outer surface 7a of the pillar 7 is held in flush with the outer peripheral surface 1aa of the circumferential ring body 1a. It is to be noted that the chamfered region may not be limited the peripheral lip region 7aa such as shown and described, but may extend over to a location intermediate of the width of each pillar 7.

The roller retainer 1 is made of a synthetic resin. By way of example, material for the roller retainer 1 may be a mixture of polyamide (PA) 46 with 25% of glass fibers (GF) or a mixture of polyamide (PA) 66 with 25 to 30% of glass fibers (GF).

The caged roller assembly of the structure described above functions as follows. Any possible separation of each needle roller 2 from the respective pocket 3 in a direction radially outwardly of the roller retainer 1 can be prevented by the neighboring pillars 7 on respective sides of such pocket 3 while any possible separation of the needle roller 2 from the respective pocket 3 in a direction radially inwardly of the roller retainer 1 can be prevented by the engagement of the bearing bosses 4 into the associated bearing recesses 2a at the opposite end faces of such needle roller 2. The engagement of the bearing bosses 4 into the associated bearing recesses 2a also provides a capability of preventing the respective needle rollers 2 from being detached out of the associated pockets 3 in the radially outward direction, but the neighboring pillars 7 on respective sides of the pockets 3 bring about a cumulative effect to this capability to thereby ensure that the needle rollers 2 are retained in position within the respective pockets 3 in the roller retainer 1. Accordingly, in a condition in which the caged roller assembly of the present invention has not yet been used in a machine or apparatus, there is no possibility that some or all of the needle rollers 2 may separate from the roller retainer 1 and, therefore, the bearing is highly easy to handle.

In order to mount the needle rollers 2 into the respective pockets 3 during assemblage of the caged roller assembly of the present invention, each of the needle rollers 2 has to be forcibly pressed from inside the circumferential ring body 1a into between the opposite annular flanks 1b until the bearing bosses 4 are engaged in the respective bearing recesses 2a in the needle roller 2. As the respective needle roller 2 is forcibly pressed into between the annular flanks 1b, the roller retainer 1 undergoes an elastic deformation allowing the annular flanks 1b to expand away from each other against the resiliency exhibited by the roller retainer 1 to allow the bearing bosses 4 to be snapped into the respective bearing recesses 2a. Immediately after the bearing bosses 2a have been engaged in the respective bearing recesses 2a, the resiliency of the roller retainer 1 causes the annular flanks 1b to restore to the original position, thereby completing the mounting of each needle roller 2 into the associated pocket 3 with the bearing bosses 4 loosely engaged in the associated bearing recesses 2a.

Thus, the roller retainer 1 designed according to the present invention has a capability of preventing any one of the needle rollers 2 from being separated out of the associated pocket 3 in a direction either radially outwardly or radially inwardly of the roller retainer 1. Specifically, so long as separation of the needle rollers 2 in the direction radially inwardly of the roller retainer 1 is concerned, the bearing bosses 4 rigid or fast with the opposite annular flank 1b are effective to achieve it and, therefore, each of the pillars 7 may not be shaped to represent a generally V-shaped configuration having inner roller stopper at a tip portion thereof as employed in the prior art and can have a simplified shape. For this reason, manufacture of the caged roller assembly of the present invention is substantially free from any possible limitations and each pillar 7 can have a relatively small width so that the number of the needle rollers 2 to be used can advantageously be increased. Moreover, without increasing a space for installation of the caged roller assembly of the present invention, the load bearing capacity thereof can be increased.

When the caged roller assembly is in use, the needle rollers 2 are each guided by the roller guides 3a two on each side wall of the associated pocket 3. Since each pair of the roller guides 3a are located on each side wall of the associated pocket 3 with a generally intermediate portion of each side wall of the associated pocket 3 depressed inwardly in a circumferential direction of the circumferential ring body 1a to thereby define the depressed region 5, a multiplicity of paths of flow of a lubricant oil being circulated that communicates between an area along the outer periphery of the roller retainer 1 and an area along the inner periphery of the roller retainer 1 can be defined by the depressed regions 5 and, therefore, it is possible to effectively avoid any possible reduction in lubrication which would otherwise be brought about as a result of the roller guides 3a then hampering a smooth flow of the lubricant. For this reason, undesirable increase of the torque resulting from lack of an insufficient lubrication can advantageously be avoided. Also, since each of the pillars 7 has a circumferentially extending groove segment 6 defined on an outer peripheral surface thereof so as to extend a distance bound by the depressed region 5, the circumferential groove segments 6 on all of the pillars 7 contribute to a smooth flow of the lubricant oil.

Also, since the peripheral lip region 7aa surrounding each pocket 3 and lying on a radially outer surface 7a of the adjacent pillar 7 is positioned a location radially inwardly of the outer peripheral surface 1aa of the circumferential ring body 1a and adjacent a direction adjacent the pitch circle PCD, scraping of the lubricant oil by an edge of the peripheral lip region 7aa can advantageously be lessened to thereby suppress a loss of torque which would otherwise occur as a result of lack of the lubricant oil during rotation.

Since each of the needle roller 2 is rotatably supported with the bearing recesses 2a on the opposite end faces thereof receiving therein the respective bearing bosses 4, there is no possibility that the needle roller 2 may be undesirably skewed about its own longitudinal axis. The bearing recesses 2a also serve as an oil sump and, therefore, it is possible to effectively minimize or substantially eliminate any possible frictional wear of the adjacent annular flanks 1b which may alternately and slidingly contacts the opposite end faces of the respective needle roller 2 then rotating about its own longitudinal axis at a predefined position relative to the roller retainer 1. Any possible depletion of an oil film on a rolling surface can also be minimized or substantially eliminated. In other words, while since in the prior art bearing of a similar kind rollers are rotatably retained by roller stoppers, the roller stopper often causes the oil film on the rolling surface to be depleted, the illustrated embodiment is effective in that since the needle rollers 2 are rotatably retained by the bearing bosses 4 loosely engaged in the bearing recesses 2a on the opposite end faces of those needle rollers 2, the oil film on the rolling surface can be effectively prevented from being depleted.

Figure 4A:
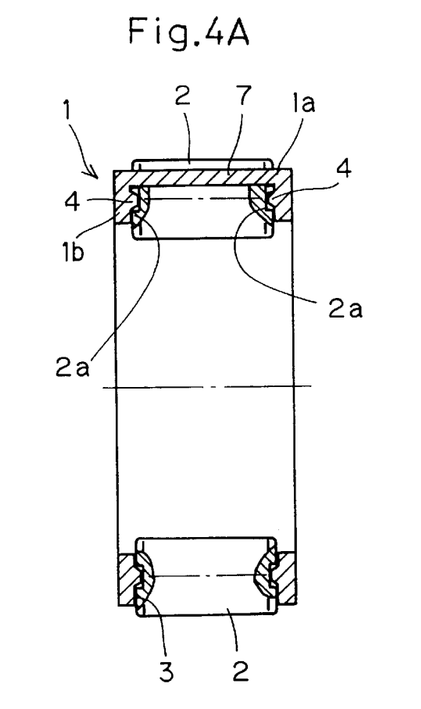
FIG. 4A is a schematic longitudinal sectional view, with a portion removed, showing the caged roller assembly according to a second preferred embodiment of the present invention.
Figure 4B:
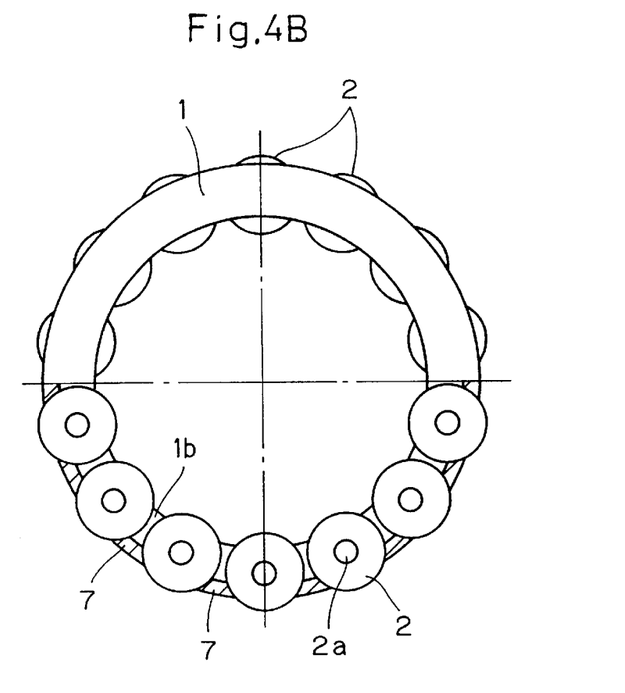
FIG. 4B is a fragmentary end view, on an enlarged scale, of a portion of the caged roller assembly shown in FIG. 4A.

It is to be noted that in the foregoing embodiment of the present invention, the roller retainer 1 has been shown and described as having the depressed regions 5 on the opposite side walls of each pocket 3 and the circumferential groove segment 6 on the outer peripheral surface of each pillar 7, those depressed regions 5 and those circumferential groove segments 6 may not be always essential and may be dispensed with as shown in FIGS. 4A and 4B.

Figure 5A:
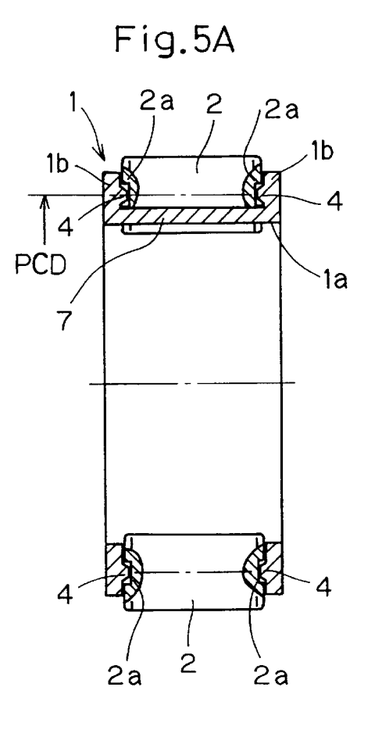
FIG. 5A is a schematic longitudinal sectional view, with a portion removed, showing the caged roller assembly according to a third preferred embodiment of the present invention.
Figure 5B:
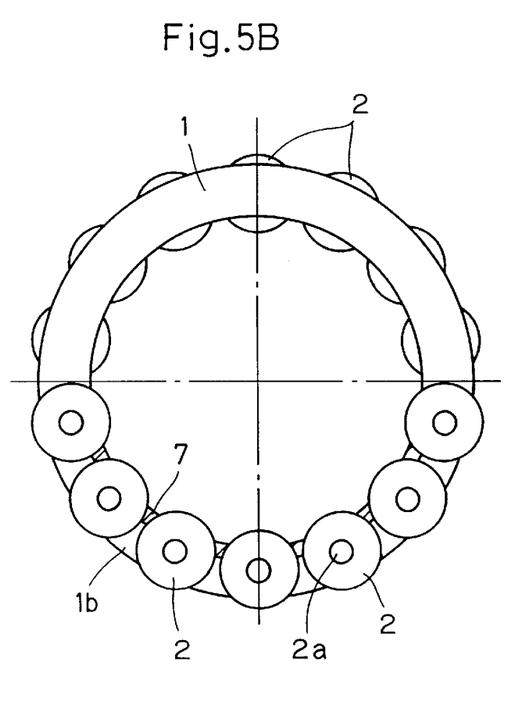
FIG. 5B is a fragmentary end view, on an enlarged scale, of a portion of the caged roller assembly shown in FIG. 5A.

Also, as shown in FIGS. 5A and 5B, the roller retainer 1 may be of a structure in which the circumferential ring body 1a and the annular collars or flanks 1b are reversed in position relative to each other. More specifically, in the roller retainer 1 shown in FIG. 5A, the circumferential ring body 1a has outer and inner diameters smaller than the diameter of the pitch circle PCD and the annular collars or flanks 1b are so formed and so positioned so as to protrude radially outwardly from opposite ends of the ring body 1a. Other structural features of the roller retainer 1 shown in FIGS. 5A and 5B are similar to those in the previously described embodiment shown in FIGS. 1A to 3B.

Figure 6:
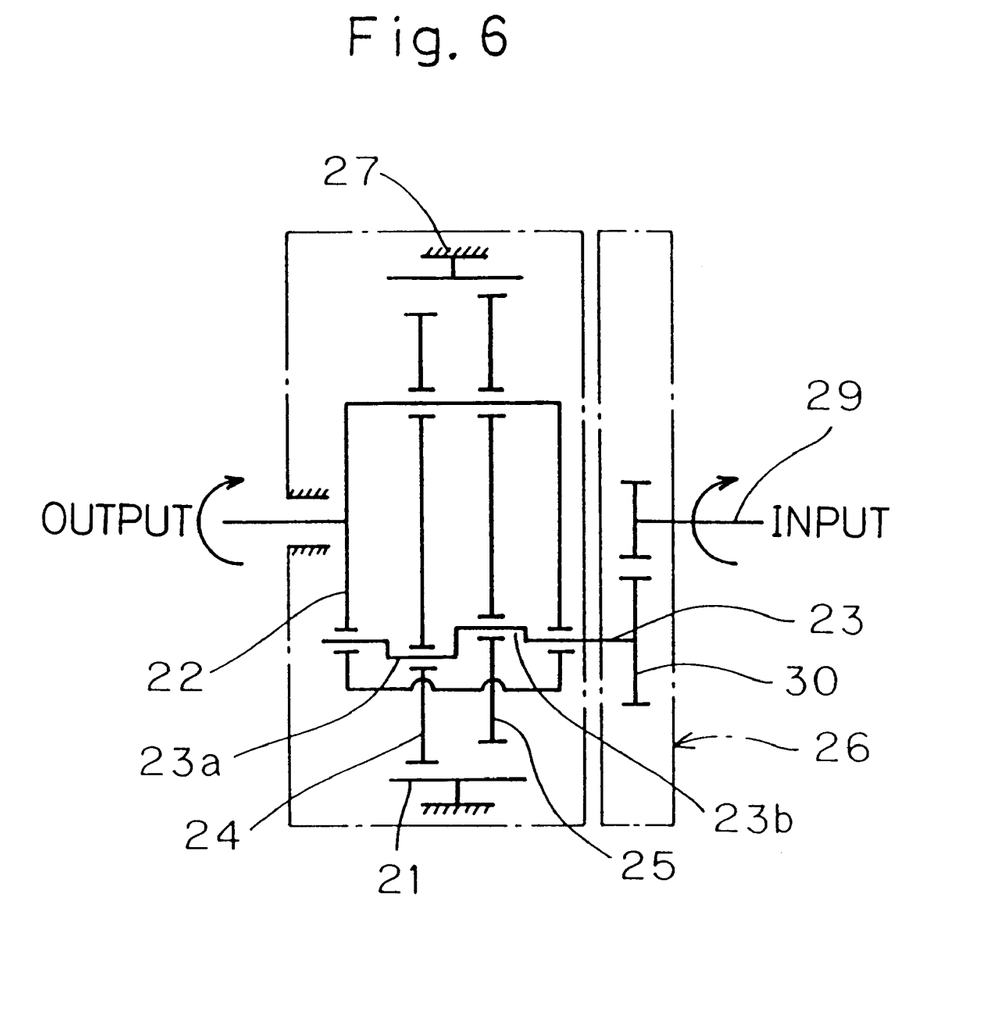
FIG. 6 is a schematic diagram showing a planetary reduction gear unit employing the caged roller assembly of the present invention.
Figure 7:
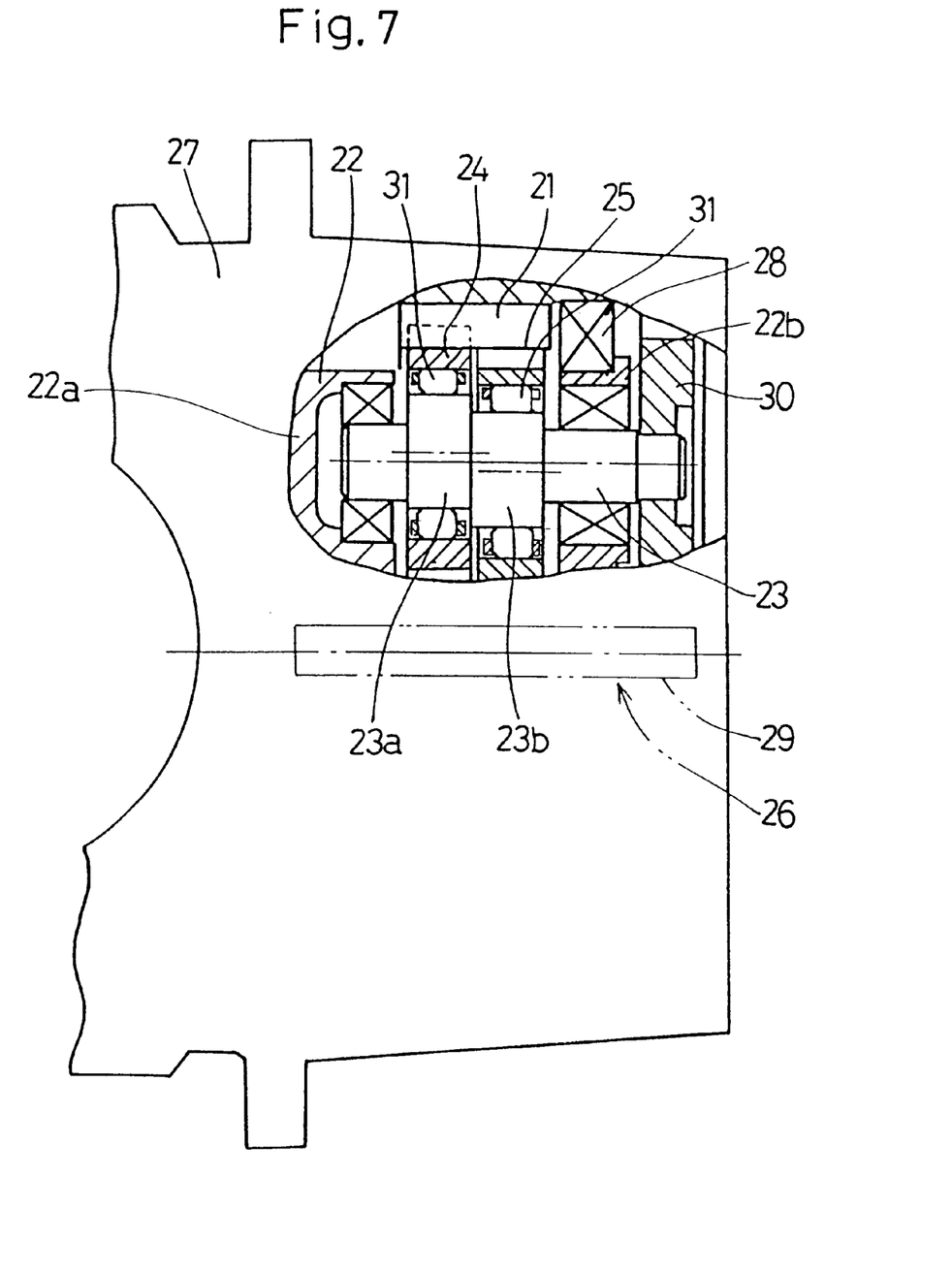
FIG. 7 is a longitudinal side view of the planetary reduction gear unit of FIG. 6 with a portion cut out to show the caged roller assembly of the present invention used therein.

FIGS. 6 and 7 illustrates an embodiment of the caged roller assembly of the present invention applied in a planetary gear reduction unit. The planetary gear reduction unit shown therein includes an internally threaded sun gear 21, a carrier 22 that serves as a rotational output device, a plurality of, for example, three crankshafts 23 each rotatably supported by the carrier 22 and having a plurality of neighboring eccentric cam portions 23a and 23b formed integrally therewith, a plurality of planetary gears 24 and 25 rotatably mounted on the respective eccentric cam portions 23a and 23b of the associated crankshaft 23 and drivingly engaged with the sun gear 21, and a rotational input device 26 for transmitting a rotational force to the crankshaft 23.

The sun gear 21 is fixed to a housing 27 whereas the carrier 22 is disposed within the housing 27 through a bearing assembly 28 (FIG. 7) so as to be rotatable concentrical with the sun gear 21. The rotational input device 26 includes an input shaft 29 concentrical with the sun gear 21 and a transmission gear 30 mounted on each of the crankshafts 23 and meshed with an externally geared portion of the input shaft 29 for transmitting a rotational force of the input shaft 29 to the crankshaft 23. A plurality of the crankshafts 23 are so supported as to extend generally parallel to each other and are positioned spaced an equal distance from each other in a direction circumferentially of the carrier 22. The planetary gears 24 and 25 for each of the crankshafts 23 are, as shown in FIG. 7, disposed on the respective eccentric cam portions 23a and 23b of each crankshaft 23 through a caged roller assembly 31. This caged roller assembly 31 referred to above is designed according to the present invention and may be the one according to any one of the first to third embodiments thereof.

The planetary gear reduction unit of the structure described above operates in the following manner. When the input shaft 29 is driven about its own longitudinal axis, the crankshafts 23 are driven in unison with each other through the respective transmission gears 30. As the drive of the input shaft 29 is transmitted to the crankshaft 23 in this way, a first stage speed reduction takes place. The crankshafts 23 and the planetary gears 24 and 25 are drivingly coupled with each other through the associated caged roller assemblies 31 and, accordingly, rotation of the crankshafts 23 are synchronized with a composite movement made up of revolution of the planetary gears 24 and 25 within the sun gear 21 and rotation of the planetary gears 24 and 25 in mesh with the sun gear 21. The planetary gears 24 and 25 juxtaposed relative to each other in a direction axially of the respective crankshaft 23 are shifted 180° in phase from each other and revolve within the sun gear 21 while rotating about their own axes. For this reason, inertia forces which would be brought about by centrifugal whirling of those planetary gears 24 and 25 are counteracted. The internally threaded sun gear 21 is fixed in position whereas the planetary gears 24 and 25 revolve within the sun gear 21 in mesh therewith. The crankshafts 23 are interposed between two discs 22a and 22b of the carrier 22 serving as output members. Accordingly, revolution of the planetary gears 24 and 25 is transmitted to the carrier 22 through revolution of the crankshafts 23, with a speed-reduced rotation consequently outputted.

In this planetary reduction gear unit, a relatively large load acts on the caged roller assemblies 31 interposed between the planetary gears 24 and 25 and the crankshafts 23 and, also, the space available for installation of the caged roller assemblies 31 lies in a space limited to avoid increase of the size of the reduction gear unit as a whole. In addition, the roller retainer of each of the caged roller assemblies 31 is held in sliding contact with the adjacent planetary gears 24 and 25. However, with the caged roller assembly 31 according to any one of the foregoing embodiments of the present invention, a relatively large load bearing capacity can be obtained within the limited space and, since the provision has been made of the annular flanks 1b, the roller retainer 1 will not interfere with inner peripheral surfaces of the planetary gears 24 and 25 even though the annular flanks 1b slidingly contact opposite end faces of the planetary gears 24 and 25.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, in the foregoing embodiments, it has been shown and described that each of the needle rollers 2 is guided by the guides 3a defined in the opposite side walls of each pocket 3 bound between the neighboring pillars 7. However, respective portions where the bearing bosses 4 are engaged in the bearing recesses 2a defined in the opposite end faces of each needle roller 2 may be utilized to guide the respective needle roller 2.

Accordingly, such changes and modifications are, unless they depart from the scope of the present invention as delivered from the claims annexed hereto, to be construed as included therein.

What is claimed is:

1. A caged roller assembly which comprises:
a roller retainer including a large-diameter circumferential ring body having ends opposite to each other and a pair of annular flanks extending radially inwardly from the respective ends of the circumferential ring body, said circumferential ring body having a plurality of circumferentially spaced pockets defined therein;
a plurality of rollers rotatably carried by the roller retainer and rotatably positioned within the respective pockets, each of said rollers having opposite end faces each formed with an axially inwardly extending bearing recess defined therein; and
bearing bosses formed in each of the annular flanks in a circular row one for each of the pockets, the circular row of the bearing bosses in each annular flank being aligned with a pitch circle defined by respective axes of rotation of the rollers that are rotatably positioned within the associated pockets, said bearing bosses in the annular flanks being rotatably engaged in the bearing recesses on the opposite end faces of the associated rollers, said circumferential ring body having a diameter greater than the pitch circle of the rollers,
wherein each of the bearing bosses protrudes outwardly from the respective annular flank a distance smaller than a depth of the respective bearing recess on the end face of each roller.

2. A caged roller assembly which comprises:
a roller retainer including a large-diameter circumferential ring body having ends opposite to each other and a pair of annular flanks extending radially inwardly from the respective ends of the circumferential ring body, said circumferential ring body having a plurality of circumferentially spaced pockets defined therein;
a plurality of rollers rotatably carried by the roller retainer and rotatably positioned within the respective pockets, each of said rollers having opposite end faces each formed with an axially inwardly extending bearing recess defined therein; and
bearing bosses formed in each of the annular flanks in a circular row one for each of the pockets, the circular row of the bearing bosses in each annular flank being aligned with a pitch circle defined by respective axes of rotation of the rollers that are rotatably positioned within the associated pockets, said bearing bosses in the annular flanks being rotatably engaged in the bearing recesses on the opposite end faces of the associated rollers, said circumferential ring body having a diameter greater than the pitch circle of the rollers,
wherein each of the pockets is defined by opposite end walls and opposite side walls, leaving a pillar that is situated between the neighboring pockets while extending between the annular flanks, said opposite side walls of the respective pocket serving as roller guides, wherein the pillar has a transverse sectional shape wherein a peripheral lip region of an outer peripheral surface of the pillar is positioned radially inwardly of the outer peripheral surface of the circumferential ring body.

3. The caged roller assembly as claimed in claim 2, wherein each of the opposite side walls of the respective pocket being inwardly depressed at a generally intermediate portion thereof to define roller guides on respective sides of the inwardly depressed region.

4. The caged roller assembly as claimed in claim 2, wherein each of the bearing bosses protrudes outwardly from the respective annular flank a distance smaller than a depth of the respective bearing recess on the end face of each roller.

5. The caged roller assembly as claimed in claim 2, wherein the roller retainer is made of a synthetic resin.

6. The caged roller assembly as claimed in claim 2, wherein the caged roller assembly is used in a planetary reduction gear unit including a planetary gear and a crankshaft and is disposed between the planetary gear and the crankshaft.

7. A planetary reduction gear unit which comprises:
an internally or externally geared sun gear;
a carrier provided coaxially of the sun gear;
at least one crankshaft rotatably supported by the carrier and having a plurality of eccentric cam portions;
a plurality of caged roller assemblies each being of a structure as defined in claim 2; and
a planetary gear mounted on each of the eccentric cam portions of the crankshaft through the associated caged roller assembly and drivingly meshed with the sun gear.

8. A caged roller assembly which comprises:

a roller retainer including a small-diameter circumferential ring body having ends opposite to each other and a pair of annular flanks extending radially outwardly from the respective ends of the circumferential ring body, said circumferential ring body having a plurality of circumferentially spaced pockets defined therein;

a plurality of rollers rotatably carried by the roller retainer and rotatably positioned within the respective pockets, each of said rollers having opposite end faces each formed with an axially inwardly extending bearing recess defined therein; and bearing bosses formed in each of the annular flanks in a circular row one for each of the pockets, the circular row of the bearing bosses in each annular flank being aligned with a pitch circles defined by respective axes of rotation of the rollers that are rotatably positioned within the associated pockets, said bearing bosses in the annular flanks being rotatably engaged in the bearing recesses on the opposite end faces of the associated rollers, said circumferential ring body having a diameter smaller than the pitch circle of the rollers, wherein each of the bearing bosses protrudes outwardly from the respective annular flank a distance smaller than a depth of the respective bearing recess on the end face of each roller.

9. A caged roller assembly which comprises:

a roller retainer including a small-diameter circumferential ring body having ends opposite to each other and a pair of annular flanks extending radially outwardly from the respective ends of the circumferential ring body, said circumferential ring body having a plurality of circumferentially spaced pockets defined therein;

a plurality of rollers rotatably carried by the roller retainer and rotatably positioned within the respective pockets, each of said rollers having opposite end faces each formed with an axially inwardly extending bearing recess defined therein; and bearing bosses formed in each of the annular flanks in a circular row one for each of the pockets, the circular row of the bearing bosses in each annular flank being aligned with a pitch circles defined by respective axes of rotation of the rollers that are rotatably positioned within the associated pockets, said bearing bosses in the annular flanks being rotatably engaged in the bearing recesses on the opposite end faces of the associated rollers, said circumferential ring body having a diameter smaller than the pitch circle of the rollers, wherein each of the pockets is defined by opposite end walls and opposite side walls, leaving a pillar that is situated between the neighboring pockets while extending between the annular flanks, said opposite side walls of the respective pocket serving as roller guides, wherein the pillar has a transverse sectional shape wherein a peripheral lip region of an inner peripheral surface of the pillar is positioned radially outwardly of the inner peripheral surface of the circumferential ring body.

10. The caged roller assembly as claimed in claim 9, wherein each of the opposite side walls of the respective pocket being inwardly depressed at a generally intermediate portion thereof to define roller guides on respective sides of the inwardly depressed region.

11. The caged roller assembly as claimed in claim 9, wherein each of the bearing bosses protrudes outwardly from the respective annular flank a distance smaller than a depth of the respective bearing recess on the end face of each roller.

12. The caged roller assembly as claimed in claim 9, wherein the roller retainer is made of a synthetic resin.

13. The caged roller assembly as claimed in claim 9, wherein the caged roller assembly is used in a planetary reduction gear unit including a planetary gear and a crankshaft and is disposed between the planetary gear and the crankshaft.

14. A planetary reduction gear unit which comprises:

an internally or externally geared sun gear;

a carrier provided coaxially of the sun gear;

at least one crankshaft rotatably supported by the carrier and having a plurality of eccentric cam portions;

a plurality of caged roller assemblies each being of a structure as defined in claim 9; and a planetary gear mounted on each of the eccentric cam portions of the crankshaft through the associated caged roller assembly and drivingly meshed with the sun gear.

* * * * *